E. S. BLAKE.
Lamp Chimney.
No. 41,473.
Patented Feb. 9, 1864.
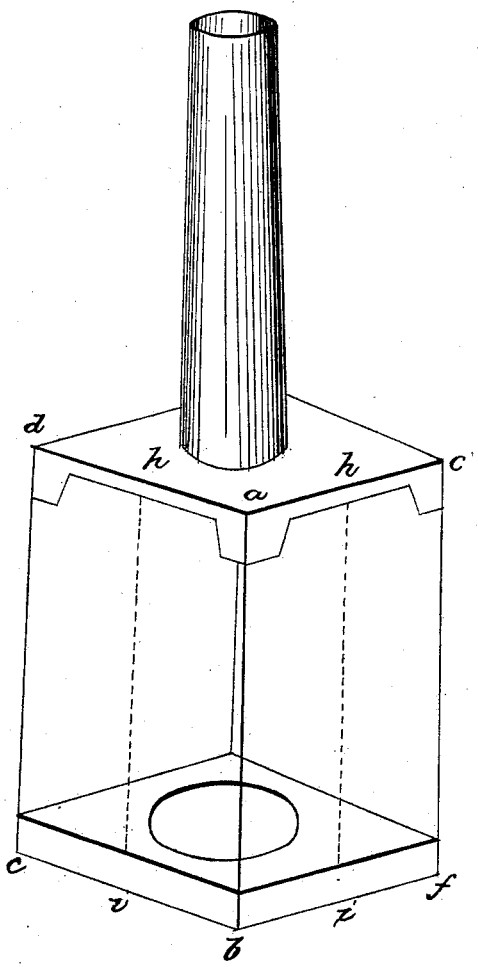
Witnesses
J. J. Estep
Geo. R. South
Inventor
E. S. Blake

UNITED STATES PATENT OFFICE.

E. S. BLAKE, OF PITTSBURG, PENNSYLVANIA.

IMPROVEMENT IN LAMP-CHIMNEYS.

Specification forming part of Letters Patent No. 41,473, dated February 9, 1864.

*To all whom it may concern:*

Be it known that I, E. S. BLAKE, of Pittsburg, county of Allegheny, State of Pennsylvania, have invented a certain new and useful Improvement in Lamp-Chimneys; and I do hereby declare that the following is a full and exact description thereof, reference being had to the accompanying drawing, and to the letters of reference marked thereon.

My improvement in lamp-chimneys relates only to those which are composed in part of plates of flat glass; and the improvement consists in providing by a division of said plates, or by a new combination of narrow plates, against fracture of the glass from unequal expansion by heat.

The improvement, as already intimated, is effected by dividing vertically into narrower strips the plate or plates of glass belonging to the chimney, or by using in combination plates so narrow as to allow the required unequal expansion without fracture. This may be more fully illustrated by referring to the annexed figure, designed to represent in perspective a lamp-chimney in which the lower part of the shaft is composed of plates of flat glass, $a\ b\ c\ d$, $a\ b\ f\ e$, &c. If those plates be divided each into two or more parts by section—for example, at the dotted lines $h\ i$, $h\ i$—the said division gives room for expansion by the heat of the lamp-flame, so that the danger of fracture therefrom is almost entirely obviated.

The employment in lamp chimneys of glass plates of diminutive width for the specific purpose of preventing fracture by heat I regard as, in its fullest extent, new; but for the sake of distinctness I limit my claim and my request for Letters Patent to the use of two or more plates in the same plane, viz:

I claim—

In a lamp-chimney composed in part of plates of flat glass, the erection of any two or more of said plates in the same plane, to form a part of the shaft of the chimney, as and for the purpose set forth.

E. S. BLAKE.

Witnesses:
 I. T. ESTES,
 GEO. R. SOUTH.